United States Patent
Chang

(10) Patent No.: US 9,687,925 B2
(45) Date of Patent: Jun. 27, 2017

(54) ELECTROLYTIC MACHINING SYSTEM AND ELECTROLYTIC MACHINING METHOD

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 283 days.

(21) Appl. No.: 14/488,948

(22) Filed: Sep. 17, 2014

(65) Prior Publication Data

US 2015/0083608 A1  Mar. 26, 2015

(30) Foreign Application Priority Data

Sep. 24, 2013 (CN) .......................... 2013 1 0436709

(51) Int. Cl.
| | | |
|---|---|---|
| *B23H 3/02* | (2006.01) | |
| *B23H 3/04* | (2006.01) | |
| *C25F 7/00* | (2006.01) | |
| *C25F 3/02* | (2006.01) | |

(52) U.S. Cl.
CPC ................. *B23H 3/02* (2013.01); *B23H 3/04* (2013.01); *C25F 3/02* (2013.01); *C25F 7/00* (2013.01)

(58) Field of Classification Search
CPC ..... C25F 7/00; C25F 7/02; C25F 3/02; B23H 3/02; B23H 3/04; C25D 7/12; C25D 21/12

See application file for complete search history.

(56) References Cited

U.S. PATENT DOCUMENTS

| | | | | | |
|---|---|---|---|---|---|
| 4,331,524 | A | * | 5/1982 | Matthes | ................... B23H 3/02 204/224 M |
| 2011/0210005 | A1 | * | 9/2011 | Van Den Bossche | ... B23H 3/02 205/82 |

FOREIGN PATENT DOCUMENTS

| | | |
|---|---|---|
| CN | 102198549 A | 9/2011 |
| CN | 102357689 A | 2/2012 |
| CN | 103008808 A | 4/2013 |

* cited by examiner

*Primary Examiner* — Nicholas A Smith
(74) *Attorney, Agent, or Firm* — Steven Reiss

(57) ABSTRACT

An electrolytic machining system includes a controller, a drive member coupled to the controller, a power supply, a diving circuit, a detecting circuit, and an electrode module. The diving circuit is coupled to the power supply module and configured to divide a total voltage taken from the power supply module into a plurality of independent working voltages. The detecting circuit is coupled to the dividing circuit and the electrode assembly. The detecting circuit detects each independent working voltage and feeds back information as to the level of the independent working voltage to the controller as the electrode assembly is moved towards a workpiece. When the detection indicates an incorrect working voltage, the controller controls the drive member to move the electrode assembly away from the workpiece.

9 Claims, 5 Drawing Sheets

ELECTROLYTIC MACHINING SYSTEM AND ELECTROLYTIC MACHINING METHOD

FIELD

The subject matter herein generally relates to machining by electrolysis.

BACKGROUND

Electrolytic machining is performed by concentrating electrodissolution on certain parts of a workpiece as required, to form recesses, bores, patterns, and other material removals.

BRIEF DESCRIPTION OF THE DRAWINGS

Implementations of the present technology will now be described, by way of example only, with reference to the attached figures.

DETAILED DESCRIPTION

Figure 1:
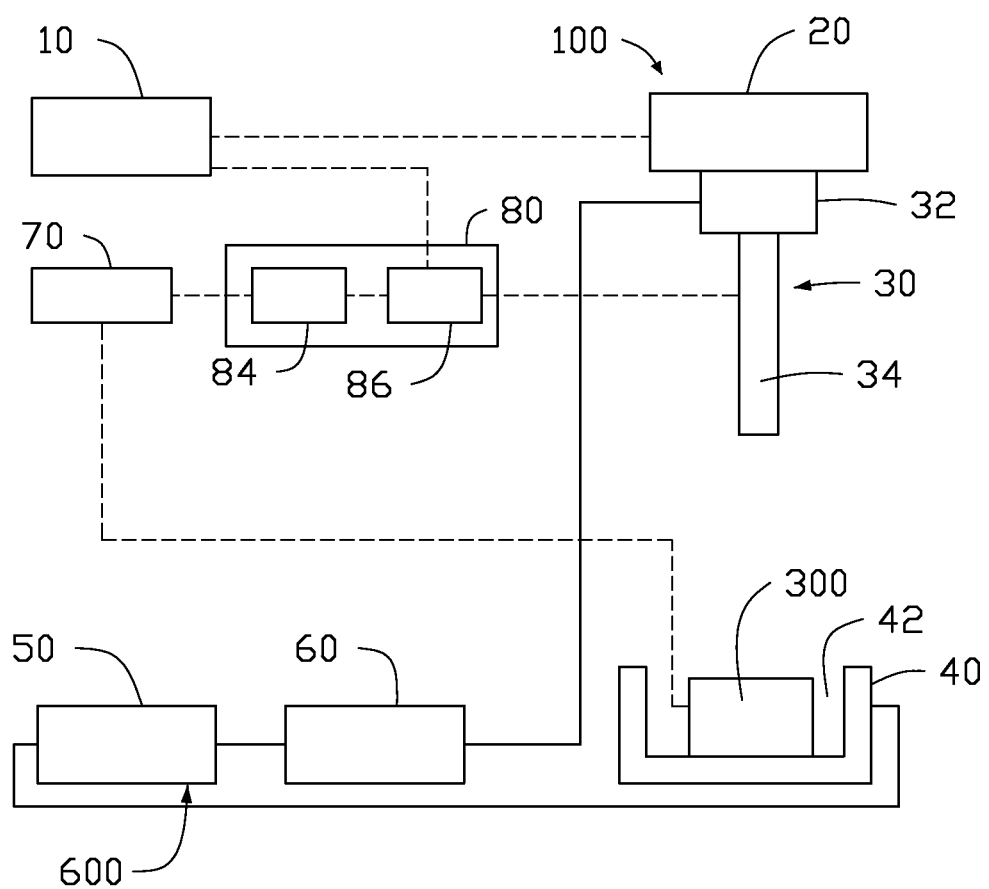
FIG. 1 is a diagrammatic view of an embodiment of an electrolytic machining system including an electrode module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

An electrolytic machining system can include a controller, a drive member electrically coupled to the controller, and a power supply module. A dividing circuit which is electrically coupled to the power supply module and configured to divide a total voltage taken from the power supply module into a plurality of independent working voltages is also included, together with a detecting circuit electrically coupled to the dividing circuit and configured to detect each independent working voltage and feed back a result of detection to the controller. An electrode module is installed on the drive member. The electrode module can include a printed circuit board electrically coupled to the detecting circuit, and an electrode assembly including a plurality of electrode tubes arranged in a matrix and electrically coupled to the printed circuit board. Each independent working voltage is supplied to an electrode tube via the printed circuit board during a movement of the electrode assembly in a direction towards a workpiece, and the controller controls the drive member to move the electrode assembly away from the workpiece when the result of detection of the detecting circuit indicates an incorrect working voltage.

A method for electrolytic machining of a workpiece can include the following procedures. An initialization processing gap is set in a controller, a workpiece is installed in an electrolysis cell, and a power supply module provides a power source to the workpiece. An electrode assembly, with a plurality of electrolytes, is positioned in the initialization processing gap, and the electrode assembly is moved towards the workpiece to process the workpiece. The detecting circuit detects each independent working voltage and feeds back a result of detection to the controller, the electrode assembly being moved away from the workpiece after processing.

FIG. 1 illustrates an embodiment of an electrolytic machining system 100 configured to machine a workpiece 300 which is used as an anode. The electrolytic machining system 100 can include a controller 10, a drive member 20, an electrode module 30, an electrolyte supply system 600, a power supply module 70, and a current divider 80.

The drive member 20 can be electrically coupled to the controller 10 and can be given commands by the controller 10. In at least one embodiment, the controller 10 can be a computer.

The current divider 80 can include a dividing circuit 84 and a detecting circuit 86. The dividing circuit 84 can be electrically coupled to the power supply module 70 and can be configured to divide a total voltage or a total current taken from the power supply module 70 into a plurality of independent working voltages or independent working currents. Each of the independent working voltages or independent working currents can be controlled independently by the controller 10. The independent working voltages and independent working currents can be supplied to the electrode module 30. The detecting circuit 86 can be electrically coupled to the dividing circuit 84, the controller 10, and the electrode module 30. The detecting circuit 86 can be configured to detect and feedback information as to each independent working voltage or independent working current to the controller 10.

Figure 2:
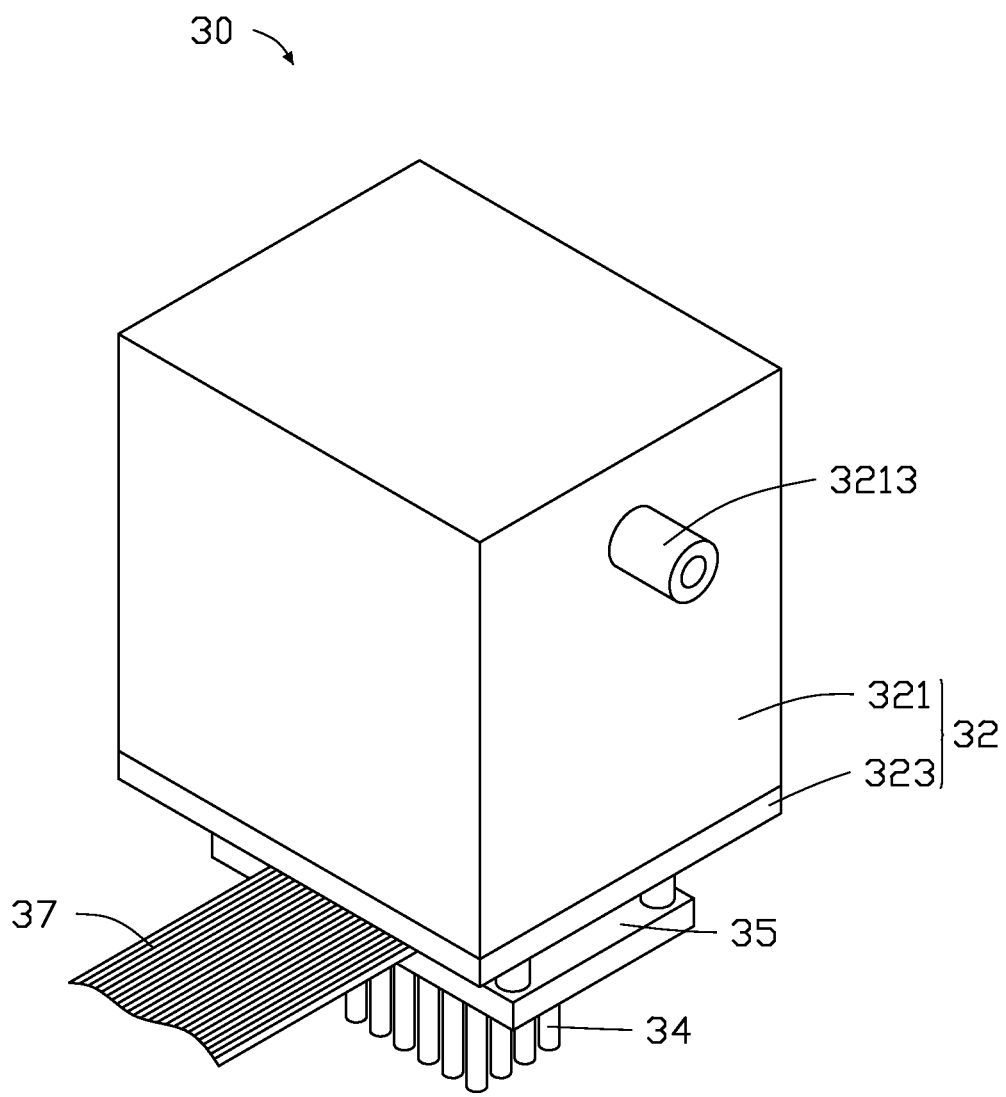
FIG. 2 is an isometric view of the electrode module of FIG. 1.
Figure 3:
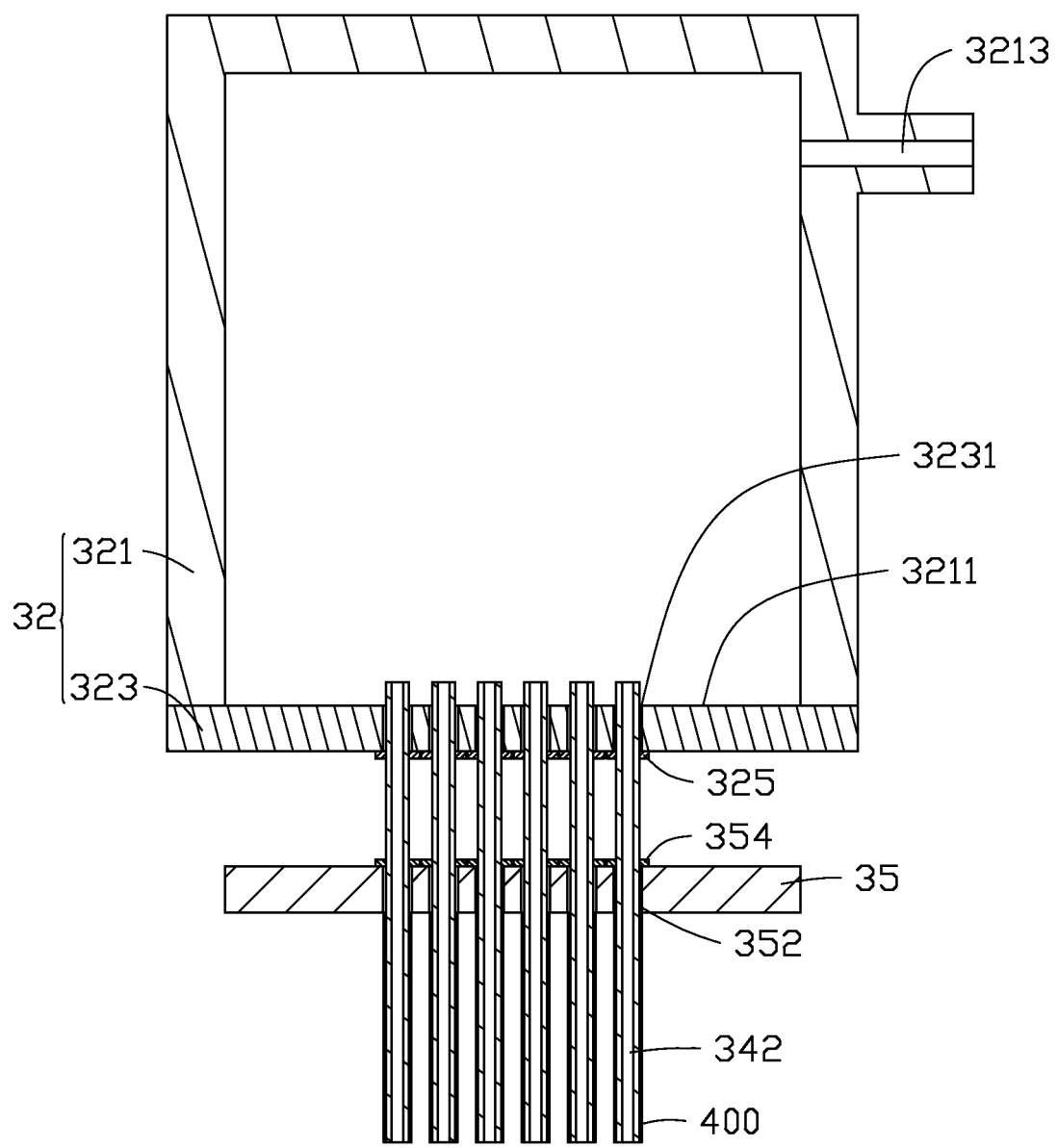
FIG. 3 is a cross-sectional view of the electrode module of FIG. 2.
Figure 4:
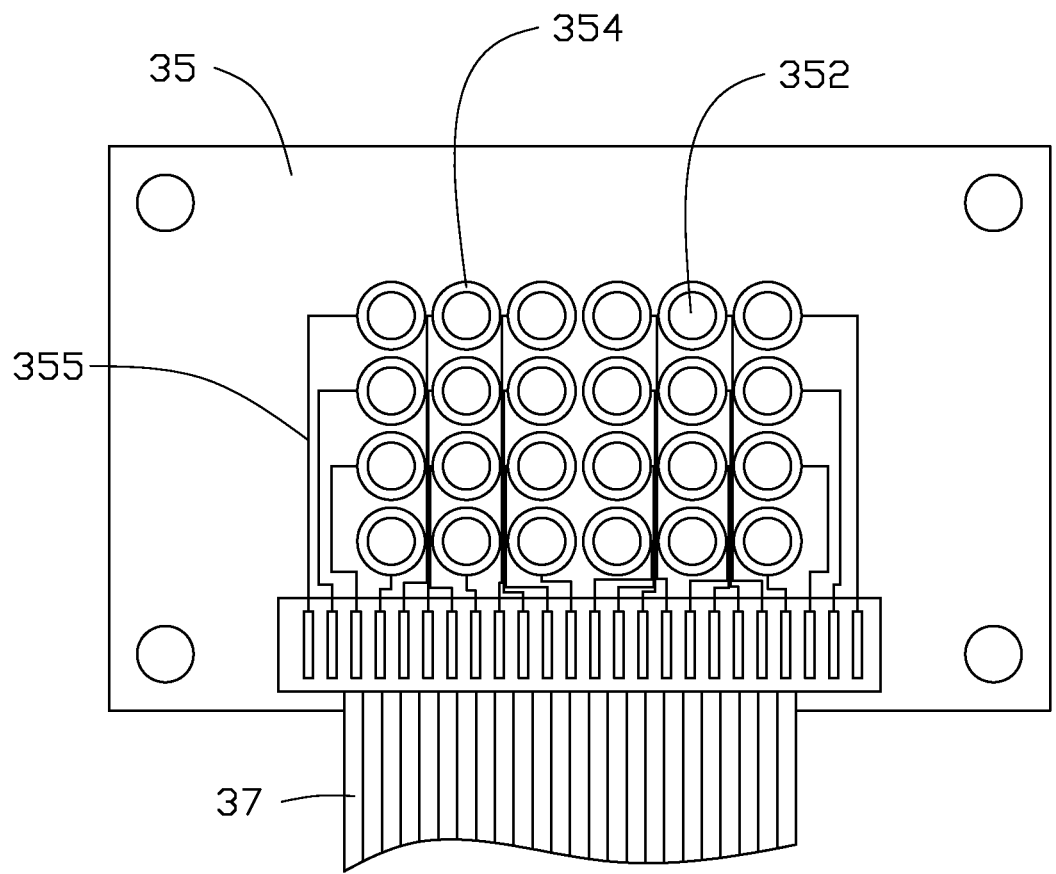
FIG. 4 is a bottom plan view of a portion of the electrode module of FIG. 2.

FIGS. 2-4 illustrate that the electrode module 30 can be securely installed on the drive member 20 and can include a fixture 32, an electrode assembly 34, a printed circuit board 35, and a flexible printed circuit board 37. The fixture 32 can be securely installed on a driving end of the drive member 20 and include a base body 321 and a cover 323. The base body 321 can be substantially a rectangular box with an opening 3211. An injecting portion 3213 can protrude from a sidewall of the base body 321 and communicate with the opening 3211. The injecting portion 3213 can be hollow. The cover 323 can cover and seal the opening 3211. The cover 323 can define a plurality of first holes 3231 therethrough which are arranged in a matrix. A plurality of first solder layers 325 can be coated on a side of the cover 323 away from the base body 321. The first solder layers 325 can be located on a single plane and spaced from each other. Each first solder layer 325 can be arranged around a periphery of a first hole 3231.

The printed circuit board 35 can be securely installed on the side of the cover 323 away from the base body 321 and spaced from the cover 323. The printed circuit board 35 can define a plurality of second holes 352 corresponding to the plurality of first holes 3231. A plurality of second solder layers 354 can be coated on a side of the printed circuit board 35 adjacent to the cover 323. The second solder layers 354 can be located on their own plane and spaced from each other. Each second solder layer 354 can be arranged around a periphery of a second hole 352. A plurality of wires 355 can be printed on the printed circuit board 35 and located adjacent to the second solder layers 354. The wires 335 can be configured to be electrically coupled to the flexible printed circuit board 37. The flexible printed circuit board 37 can be electrically coupled to the detecting circuit 86. Each independent working voltage or independent working current can be supplied to each wire 355 via the detecting circuit 86 and the flexible printed circuit board 37.

The electrode assembly 34 can include a plurality of electrode tubes 342 arranged in a matrix and used as cathodes. Each electrode tube 342 can be inserted into one of the first holes 3231 and a second hole 352, to be partially received in the base body 321 and electrically coupled to a wire 355 corresponding to the second hole 352. In this way, each independent working voltage or independent working current can be supplied to an electrode tube 342 via a wire 355. In at least one embodiment, the first solder layers 325 and the second solder layers 354 can be melted with heat to fasten the electrode tubes 342 to the cover 323 and the printed circuit board 35. The first solder layers 325 and the second solder layers 354 can be omitted as long as each electrode tube 342 can be electrically coupled to a wire 355 and be fastened to the fixture 32 and the printed circuit board 35.

In at least one embodiment, the flexible printed circuit board 37 can be omitted. For example, the detecting circuit 86 can be coupled to the wires 355 directly, as long as the plurality of electrode tubes 342 can be independently electrically coupled to the detecting circuit 86. The detecting circuit 86 can be configured to detect whether each electrode tube 342 is short-circuited.

FIGS. 1 to 3 illustrate that the electrolyte supply system 600 can include an electrolysis cell 40, a processing tank 50, and a pump 60. The electrolysis cell 40 can be substantially rectangular and define an opening 42 towards the electrode assembly 34. The electrolysis cell 40 can be configured to collect a plurality of electrolytes (not shown). The processing tank 50 can be configured to store the electrolytes and can communicate with the electrolysis cell 40. The pump 60 can communicate with the processing tank 50 and the injecting portion 3213. The pump 60 can be configured to pump the stored electrolytes out of the processing tank 50 to the fixture 32. The electrolytes can be reused from the processing tank 50 and recirculated to the cathode tubes 342 and the electrolysis cell 40.

In at least one embodiment, a plurality of insulation layers 400 can be coated on each electrode tube 342, the cover 323, and the printed circuit board 35, so that the electrode tubes 342, the cover 323, and the printed circuit board 35 can be protected against corrosion.

Figure 5:
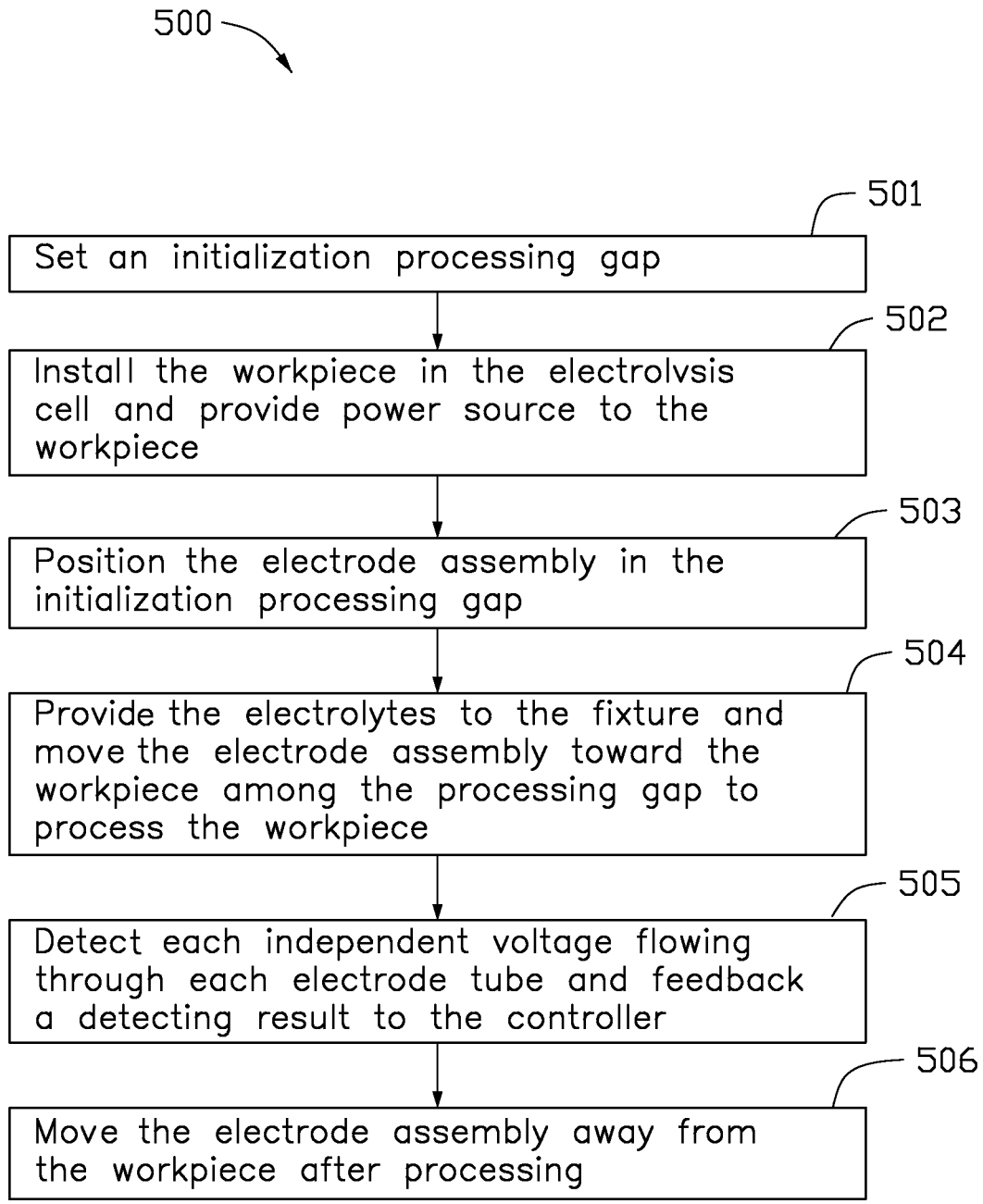
FIG. 5 is a flowchart of an embodiment of an electrolytic machining method.

FIG. 5 illustrates a flowchart in accordance with an example embodiment. The example method 500 is provided by way of example, as there are a variety of ways to carry out the method. The method 500 described below can be carried out using the configurations illustrated in FIGS. 1-4, for example, and various elements of these figures are referenced in explaining example method 500. Each block shown in FIG. 5 represents one or more processes, methods, or subroutines, carried out in the example method 500. Additionally, the illustrated order of blocks is by example only and the order of the blocks can change. The example method 500 for electrolytic machining of the workpiece 300 can begin at block 501.

At block 501, the controller can set an initialization processing gap.

At block 502, the workpiece can be installed in the electrolysis cell and electrically coupled to the power supply module. The power supply module can supply a total voltage to the dividing circuit. The dividing circuit can divide the total voltage into a plurality of independent working voltages and transfer the independent working voltages to a plurality of electrode tubes.

At block 503, the controller can control the drive member to move the electrode assembly towards the workpiece, and the electrode assembly can be positioned in the initialization processing gap.

At block 504, the electrolytes can be transported via the pump, and the controller can control the drive member to move the electrode tubes towards the workpiece in the working gap, to process the workpiece.

At block 505, the detecting circuit can detect each independent working voltage flowing through each electrode tube and feed back a result of detection to the controller during the movement of the electrode tubes with respect to the workpiece. The controller can determine whether the result of detection indicates a correct independent working voltage. When the result of detection does indicate a correct independent working voltage, the controller can control the drive member to move the electrode assembly further in the direction towards the workpiece. When the result of detection indicates an incorrect independent working voltage, the controller can control the drive member to move the electrode assembly away from the workpiece. In this way, the electrode assembly can avoid being short-circuited.

At block 506, the controller can control the drive member to move the electrode assembly away from the workpiece to a predetermined position, after processing of the workpiece.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. An electrolytic machining system comprising:
a controller;
a drive member electrically coupled to the controller;
a power supply module;
a dividing circuit electrically coupled to the power supply module and configured to divide a total voltage taken from the power supply module into a plurality of independent working voltages;

a detecting circuit electrically coupled to the dividing circuit and configured to detect each independent working voltage and feed back a result of detection to the controller;

a fixture installed on the drive member, the fixture comprising:
- a base body being rectangular and hollow, and an opening being defined in the base body;
- a cover covering and sealing the opening; and
- an injecting portion defined on the base body;

an electrode module installed on the fixture and comprising:
- a printed circuit board electrically coupled to the detecting circuit, the printed circuit board fastened to the cover; and
- an electrode assembly comprising a plurality of electrode tubes arranged in a matrix and electrically coupled to the printed circuit board; and an electrolyte supply system communicating with the fixture;

wherein a chamber is sealed by the base body and the cover, and electrolytes are injected into the chamber through the injecting portion;

wherein each independent working voltage is supplied to an electrode tube by the printed circuit board during a movement of the electrode assembly with respect to a workpiece, and the controller controls the drive member to move the electrode assembly away from the workpiece when the result of detection of the detecting circuit indicates an incorrect working voltage.

2. The electrolytic machining system of claim 1, wherein the printed circuit board is separated from the cover, the plurality of electrode tubes extend through the printed circuit board and the cover to be partially received in the base body.

3. The electrolytic machining system of claim 1, wherein the cover defines a plurality of first holes for the plurality of electrode tubes extending through the first holes and to be partially received in the base body.

4. The electrolytic machining system of claim 3, wherein a plurality of first solder layers are coated on a side of the cover, the plurality of first solder layers face away from the base body and spaced from each other, and each of the plurality of first solder layers is positioned around a periphery of a first hole.

5. The electrolytic machining system of claim 2, wherein the electrolyte supply system comprises:
- an electrolysis cell,
- a processing tank configured to store a plurality of electrolytes, wherein the processing tank communicates with the electrolysis cell, and
- a pump communicating with the processing tank and the fixture.

6. The electrolytic machining system of claim 1, wherein a plurality of second holes are defined in the printed circuit board and the plurality of electrode tubes extend into and are received by the plurality of second holes.

7. The electrolytic machining system of claim 6, wherein a plurality of second solder layers are coated on a side of the printed circuit board, the plurality of second solder layers are spaced from each other and are positioned to be adjacent to the cover, wherein each of the plurality of second solder layers correspond to each of the plurality of second holes and each second solder layer is positioned around a periphery of the corresponding second hole.

8. The electrolytic machining system of claim 1, wherein a plurality of wires are printed on the printed circuit board, the plurality of wires are electrically coupled to the plurality of electrode tubes, the electrolytic machining system further comprises a flexible printed circuit board electrically coupled to the detecting circuit and the wires.

9. The electrolytic machining system of claim 1, wherein a plurality of insulation layers are coated on the plurality of electrode tubes.

* * * * *